United States Patent
Tsirkin et al.

(10) Patent No.: US 9,798,482 B1
(45) Date of Patent: Oct. 24, 2017

(54) EFFICIENT AND SECURE MEMORY ALLOCATION IN VIRTUALIZED COMPUTER SYSTEMS

(71) Applicant: Red Hat, Inc., Raleigh, NC (US)

(72) Inventors: Michael Tsirkin, Yokneam Yillit (IL); Henri van Riel, Merrimack, NH (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/369,732

(22) Filed: Dec. 5, 2016

(51) Int. Cl.
*G06F 12/00* (2006.01)
*G06F 13/00* (2006.01)
(Continued)

(52) U.S. Cl.
CPC .......... *G06F 3/0623* (2013.01); *G06F 3/0604* (2013.01); *G06F 3/0631* (2013.01);
(Continued)

(58) Field of Classification Search
CPC .... G06F 3/0601; G06F 3/0602; G06F 3/0604; G06F 3/0605; G06F 3/0607; G06F 3/062; G06F 3/0622; G06F 3/0623; G06F 3/0628; G06F 3/0629; G06F 3/0631; G06F 3/0632; G06F 3/0644; G06F 3/0646; G06F 3/0647; G06F 3/0652; G06F 3/0662; G06F 3/0664; G06F 3/0665; G06F 3/0667; G06F 3/0668; G06F 3/0671; G06F 3/0673; G06F 3/0674; G06F 3/0676; G06F 3/0677; G06F 6/0679; G06F 3/068; G06F 3/0682; G06F 3/0686; G06F 3/0688; G06F 3/0689; G06F 9/44; G06F 9/455; G06F 9/45533;
(Continued)

(56) References Cited

U.S. PATENT DOCUMENTS 8,583,875 B1 11/2013 Garthwaite et al.
8,789,034 B1 * 7/2014 Emelyanov ......... G06F 9/45558
717/169
(Continued)

OTHER PUBLICATIONS

Improving host swapping using adaptive prefetching and paging notifier; Chen, Wenzhi et al; Proceedings of the 19th ACM International Symposium on High Performance Distributed Computing; Jun. 21-25, 2010; pp. 300-303 (4 pages).*
(Continued)

*Primary Examiner* — Daniel C Chappell
(74) *Attorney, Agent, or Firm* — Lowenstein Sandler LLP (57) ABSTRACT

A system and method for efficient and secure memory allocation in virtualized systems. A hypervisor receives, from a first virtual machine (VM), a message specifying a page of memory accessible to the first VM. The hypervisor determines that the page is not accessible to other VMs, adds an identifier identifying the page to a set of free page identifiers, and associates the identifier with the first VM. The hypervisor receives a page allocation request from a second VM, and in response attempts to locate an identifier associated with the second VM in the set of free page identifiers. Responsive to a successful attempt, the hypervisor allocates to the second VM a first page of memory corresponding to the located identifier, without clearing the first page. Responsive to an unsuccessful attempt, the hypervisor clears a second page of memory and allocates the cleared second page to the second VM.

20 Claims, 7 Drawing Sheets

(51) Int. Cl.
*G06F 13/28* (2006.01)
*G06F 3/06* (2006.01)
*G06F 9/455* (2006.01)

(52) U.S. Cl.
CPC .......... *G06F 3/0647* (2013.01); *G06F 3/0652* (2013.01); *G06F 3/0667* (2013.01); *G06F 3/0673* (2013.01); *G06F 9/45558* (2013.01); *G06F 2009/4557* (2013.01); *G06F 2009/45583* (2013.01)

(58) Field of Classification Search
CPC ...... G06F 9/45558; G06F 9/48; G06F 9/4812; G06F 9/50; G06F 9/5016; G06F 9/5077; G06F 12/00; G06F 13/00; G06F 17/30067; G06F 21/60; G06F 21/78; G06F 2003/0691; G06F 2003/0692; G06F 2003/0694; G06F 2003/0695; G06F 2003/0697; G06F 2003/0698; G06F 2009/4557; G06F 2009/45562; G06F 2009/45566; G06F 2009/45575; G06F 2009/45579; G06F 2009/45583; G06F 2009/45587; G06F 2009/455591; G06F 2009/45595; G06F 2221/2143; H04L 29/06551
USPC ........................................................ 711/170
See application file for complete search history.

(56) References Cited

U.S. PATENT DOCUMENTS

| | | | | |
|---|---|---|---|---|
| 8,875,295 | B2* | 10/2014 | Lutas | G06F 12/109 713/188 |
| 9,069,782 | B2* | 6/2015 | Yang | G06F 17/30091 |
| 9,147,078 | B2* | 9/2015 | Muff | G06F 9/45533 |
| 9,201,682 | B2* | 12/2015 | Cheng | G06F 9/45558 |
| 9,280,458 | B2 | 3/2016 | Durrant | |
| 9,361,218 | B2 | 6/2016 | Ahmad et al. | |
| 9,442,754 | B1* | 9/2016 | Tsirkin | G06F 9/45558 |
| 9,459,900 | B2* | 10/2016 | Tsirkin | G06F 9/45545 |
| 9,507,540 | B1* | 11/2016 | Adogla | G06F 3/0631 |
| 9,552,233 | B1* | 1/2017 | Tsirkin | G06F 9/5088 |
| 2010/0169536 | A1 | 7/2010 | Shedel et al. | |
| 2012/0317331 | A1 | 12/2012 | Broas | |
| 2013/0339568 | A1 | 12/2013 | Corrie | |
| 2015/0242159 | A1* | 8/2015 | Tsirkin | G06F 3/0647 711/162 |
| 2016/0085695 | A1 | 3/2016 | Leslie-Hurd et al. | |
| 2016/0253201 | A1* | 9/2016 | Zhang | G06F 9/461 |

OTHER PUBLICATIONS

"Kernel Zeroes Memory?" Stack Overflow, 3 pages, downloaded from http://stackoverflow.com/questions/6004816/kernel-zeroes-memory on Sep. 1, 2016.

Hosterman, C. "Pure Storage FlashArray and Re-Examining VMware Virtual Disk Types," Cody Hosterman, FlashArray, VAAI, VMware, XCopy, Jul. 23, 2014, 9 pages, downloaded from http://www.codyhosterman.com/2014/07/pure-storage-flasharray-and-re-examining-vmware-virtual-disk-types/ on Sep. 1, 2016.

Chiang et al. "Working Set-based Physical Memory Ballooning," 10th International Conference on Autonomic Computing (ICAC '13), USENIX Association, pp. 95-99.

"Performance Best Practices for VMware vSphere® 5.5" VMware, Inc., Sep. 19, 2013, 90 pages.

* cited by examiner

EFFICIENT AND SECURE MEMORY ALLOCATION IN VIRTUALIZED COMPUTER SYSTEMS

TECHNICAL FIELD

The present disclosure is generally related to virtualized computer systems, and more particularly, memory allocation in virtualized computer systems.

BACKGROUND

Virtualization may be viewed as abstraction of some physical components into logical objects in order to allow running, for example, various operating systems concurrently and in isolation from other operating systems on one or more interconnected physical computer systems. Virtualization allows, for example, consolidating multiple physical servers into one physical server running multiple virtual machines (VMs) in order to improve the hardware utilization rate. Virtualization may be achieved by running a layer, often referred to as "hypervisor," above the hardware and below the VMs. A hypervisor may run directly on the server hardware without an operating system beneath it or as an application running under a traditional operating system. A hypervisor may abstract the physical layer and present this abstraction to VMs to use, by providing interfaces between the underlying hardware and virtual devices of VMs.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Separation of virtual machines (VMs) is one of the key principles of virtualization. For example, a cloud service provider might host an application of a first organization in a first VM, and an application of a second organization in a second VM. In order to enable data security, the VMs should be completely separated from each other, even when hosted on the same physical machine.

In addition, in virtualized systems of the prior art, when a hypervisor allocates a page of memory to a first VM, the hypervisor first clears the page (e.g., writes zeroes to every memory location in the page, etc.) before allocating the page to the first VM, in case that the page was previously used by a second VM and de-allocated. For example, a VM may comprise a virtual device whose memory usage shrinks over time; such a virtual device may be referred to by the descriptive term "balloon" virtual device. For such a virtual device, memory that is no longer being used may be relinquished to the hypervisor and then re-allocated by the hypervisor to a different VM. Similarly, memory used by a VM may be relinquished to the hypervisor when the VM is migrated or destroyed.

Consequently, in virtualized systems of the prior art, hypervisors always clear pages of memory before allocating them to VMs, thereby ensuring that data already stored in pages are not "leaked" to VMs. While such clearing of memory ensures data security, there is a performance penalty incurred by clearing pages, and by always clearing pages before allocation, the accumulated penalty incurred can significantly reduce performance.

Described herein are methods and systems that are capable of reducing this accumulated penalty, and thus improving performance in virtualized systems, without compromising data security. Aspects of the present disclosure therefore address the above noted deficiencies of virtualized systems of the prior art.

In one implementation, VMs send messages to a hypervisor to inform the hypervisor when particular pages of memory are no longer needed. In response, the hypervisor adds identifiers of the particular pages to a set of free page identifiers, and associates each identifier with the particular VM that relinquished the page. When the hypervisor receives a page allocation request by a VM, the hypervisor checks whether there is a free page that was previously relinquished by that VM. If there is, then the free page can be allocated to the VM without clearing the page. Otherwise, a free page should be cleared by the hypervisor before allocating the free page to the VM.

In some implementations, prior to clearing a page and allocating the page to a requesting VM, the hypervisor may verify that the page is not accessible by any other VMs. Otherwise, data that is stored in the page by another VM, and might be read by this other VM at some point in the future, will be lost.

Aspects of the present disclosure are thus capable of improving performance in virtualized systems. Accordingly, computer systems hosting virtual machines in accordance with aspects of the present disclosure can operate more efficiently than systems of the prior art. Advantageously, the performance improvements do not compromise data security, and therefore aspects of the present disclosure are well-suited to computing systems of cloud service providers.

Figure 1:
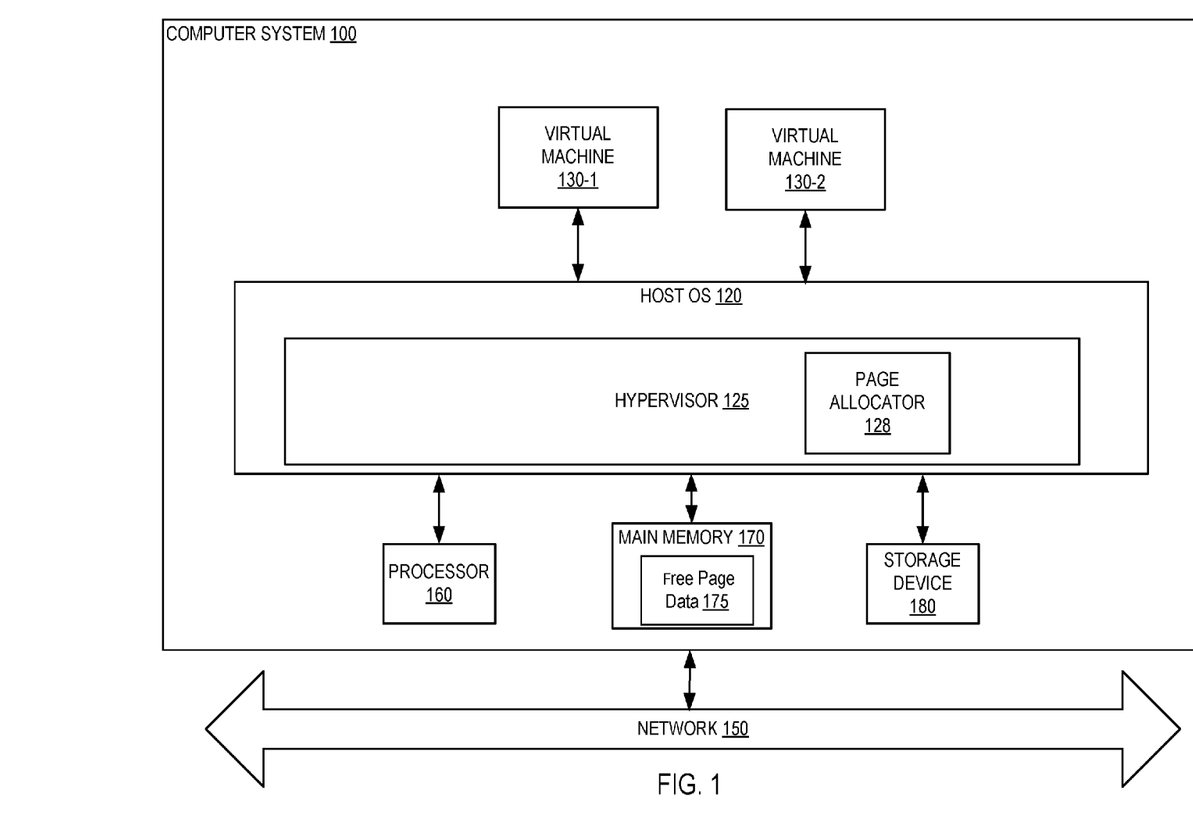
FIG. 1 depicts an illustrative computer system architecture, in accordance with one or more aspects of the present disclosure.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1.

As shown in FIG. 1, the computer system 100 is connected to a network 150 and comprises a processor 160, main memory 170, which may include volatile memory devices (e.g., random access memory (RAM)), non-volatile memory devices (e.g., flash memory), and/or other types of memory devices, and storage device 180 (e.g., a magnetic hard disk, a Universal Serial Bus [USB] solid state drive, a Redundant Array of Independent Disks [RAID] system, a network attached storage [NAS] array, etc.) that serves as a secondary memory. The computer system 100 may be a server, a router, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

"Processor" herein refers to a device capable of executing instructions encoding arithmetic, logical, or I/O operations. In one example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). It should be noted that although, for simplicity, a single processor is depicted in FIG. 1, in some other embodiments computer system 100 may comprise a plurality of processors.

Computer system 100 runs a host operating system (OS) 120 that manages the hardware resources of the computer system and that provides functions such as interprocess communication, scheduling, virtual memory management, and so forth. In some examples, host operating system 120 also comprises a hypervisor 125 that provides a virtual operating platform for VM 130 and manages the execution of VM 130. It should be noted that in some other examples, hypervisor 125 may be external to host OS 120, rather than embedded within host OS 120.

Each of VM 130-1 and VM 130-2 is an implementation of a machine that executes programs as though it were an actual physical machine. It should be noted that although, for convenience, two VMs are depicted in FIG. 1, in some other embodiments computer system 100 may host a different number of VMs.

In one implementation, hypervisor 125 maintains, in main memory 170, free page data 175, which comprises a set of identifiers of free pages that can be allocated to VMs. In some implementations, the set of page identifiers might contain free pages of memory 170 without any exception (e.g., free pages that are available to allocate to both VMs and other entities such as non-virtualized applications, etc.), while in some other implementations the set of page identifiers might contain free pages that can be allocated to VMs but not free pages that can be allocated to non-virtualized applications. In the latter case, free page data 175 might also contain another set of page identifiers for pages that can be allocated to every entity (e.g., both VMs and non-virtualized entities), or that can be allocated just to non-virtualized entities.

In accordance with one example, hypervisor 125 includes a page allocator 128 that is capable of receiving messages from VMs 130 specifying returned pages, of receiving page allocation requests from VMs 130, of maintaining free page data 175, and of allocating pages to VMs 130 in accordance with the methods of FIGS. 2 through 4 described below.

Various aspects of the above referenced methods and systems are described in details herein below by way of examples, rather than by way of limitation.

Figure 2:
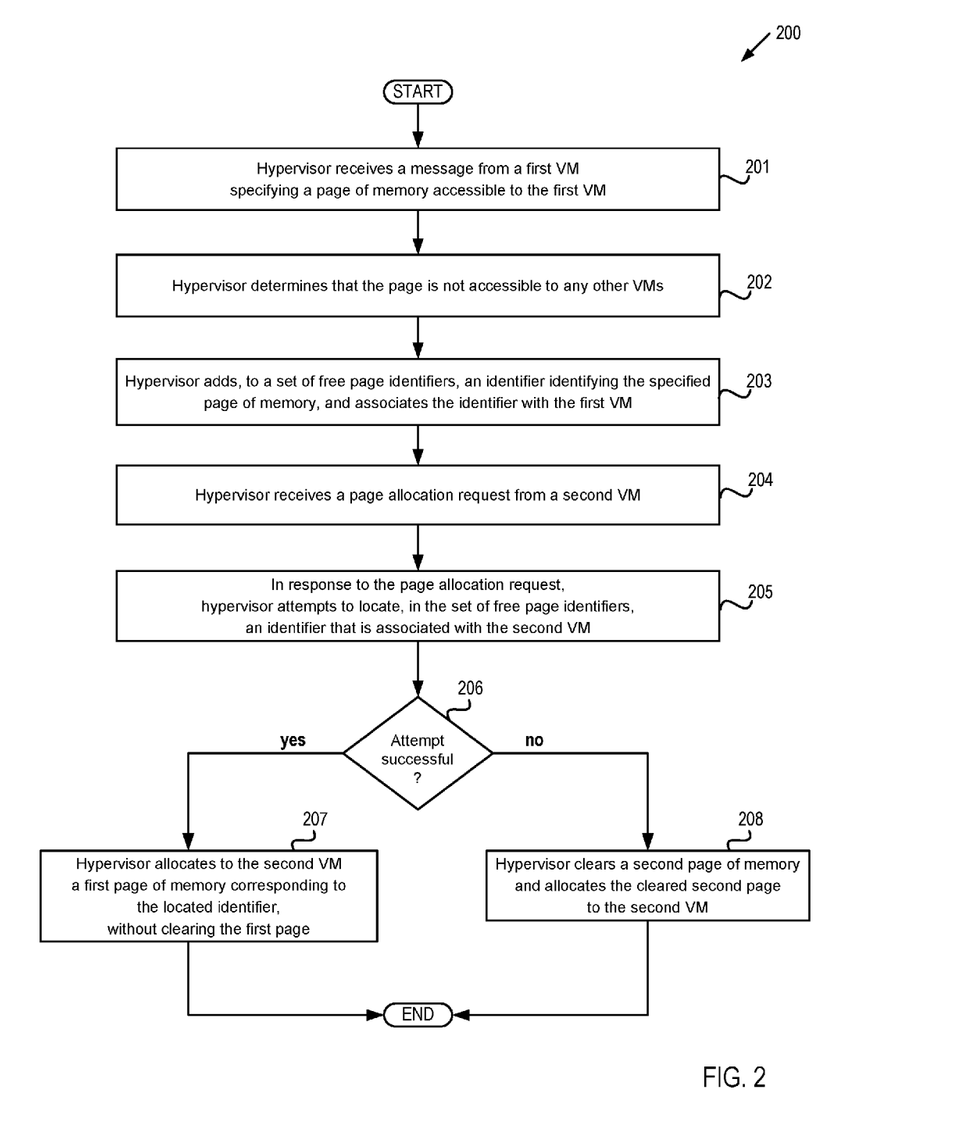
FIG. 2 depicts a flow diagram of one example of a first method for safely and efficiently allocating memory in virtualized systems, in accordance with one or more aspects of the present disclosure.

FIG. 2 depicts a flow diagram of one example of a first method 200 for safely and efficiently allocating memory in virtualized systems, in accordance with one or more aspects of the present disclosure. The method is performed by processing logic that comprises hardware (circuitry, dedicated logic, etc.), and that may also comprise computer programs (such as is run on a general purpose computer system or a dedicated machine). In one implementation, method 200 is performed by hypervisor 125 of computer system 100 of FIG. 1, and one or more blocks of the method may be performed by page allocator 128 of hypervisor 125. It should be noted that in some implementations blocks depicted in FIG. 2 may be performed simultaneously or in a different order than that depicted.

At block 201, hypervisor 125 receives from a first VM (e.g., VM 130-1 of FIG. 1, VM 130-2 of FIG. 1, etc.) a message specifying a page of memory accessible to the first VM. In some implementations, the message might be sent via a hypercall (a software trap to the hypervisor, analogous to a syscall to a host OS kernel), while in some other implementations the message might be sent via shared memory, while in yet other implementations the message might be sent in some other manner.

At block 202, hypervisor 125 determines that the page is not accessible to any other VMs; as described above, this is to ensure that data stored in the page by some other VM, and that might be read by this other VM at some point in the future, is not cleared, which would result in a loss of that data.

At block 203, hypervisor 125 adds, to a set of free page identifiers, an identifier identifying the specified page of memory, and associates the identifier with the first VM. The association enables hypervisor 125 to determine, when a page allocation request is made in the future (e.g., by the first VM, by another VM, etc.), that the page was returned to the hypervisor by the first VM—which in turn indicates to hypervisor 125 whether or not to clear the page before allocating it to the requesting VM, as described in detail below with respect to blocks 205 and 206.

At block 204, hypervisor 125 receives a page allocation request from a second VM. In response to the page allocation request, hypervisor 125 attempts at block 205 to locate, in the set of free page identifiers, an identifier of a page that is associated with the second VM. If such an identifier is found, then that means that the second VM previously returned that page to the hypervisor.

Block 206 branches based on whether the attempt at block 205 was successful. If the attempt was successful, execution proceeds to block 207; otherwise execution continues at block 208.

At block 207, hypervisor 125 allocates to the second VM a first page of memory corresponding to the located identifier, without clearing the first page. Clearing is not necessary in this case because the page previously belonged to the second VM, and was returned to the hypervisor; therefore, any data in this page was written by the second VM, and not by any other VM.

At block 208, hypervisor 125 clears a second page of memory and allocates the cleared second page to the second VM. In this case, clearing is necessary to ensure data security, because the page may have previously been written to by another VM, or by some other entity (e.g., a non-virtualized application, host OS 120, a physical device, etc.).

In some examples, the second page of memory might be in the set of free page identifiers, in which case the second page might be associated with a third VM (not depicted in FIG. 1), or might not be associated with any VM. In the case that the second page is associated with a third VM, the allocating of the second page might be in response to failing to locate, in the set of free page identifiers, an identifier that is not associated with any VM. In other words, some implementations might favor allocating a page that is not associated with any VM, over a page that is associated with another VM—the rationale being that this other VM might submit a page allocation request in the future, in which case a page already returned by this other VM can be allocated back to the VM without clearing.

In some other examples, the second page of memory might not be in the set of free page identifiers (for example, in a second set of free page identifiers that can be allocated to either VMs or non-virtualized entities, as is described above). In such cases, allocating a page that is not in the free set of identifiers might be done when the set of free page identifiers is empty.

Figure 3:
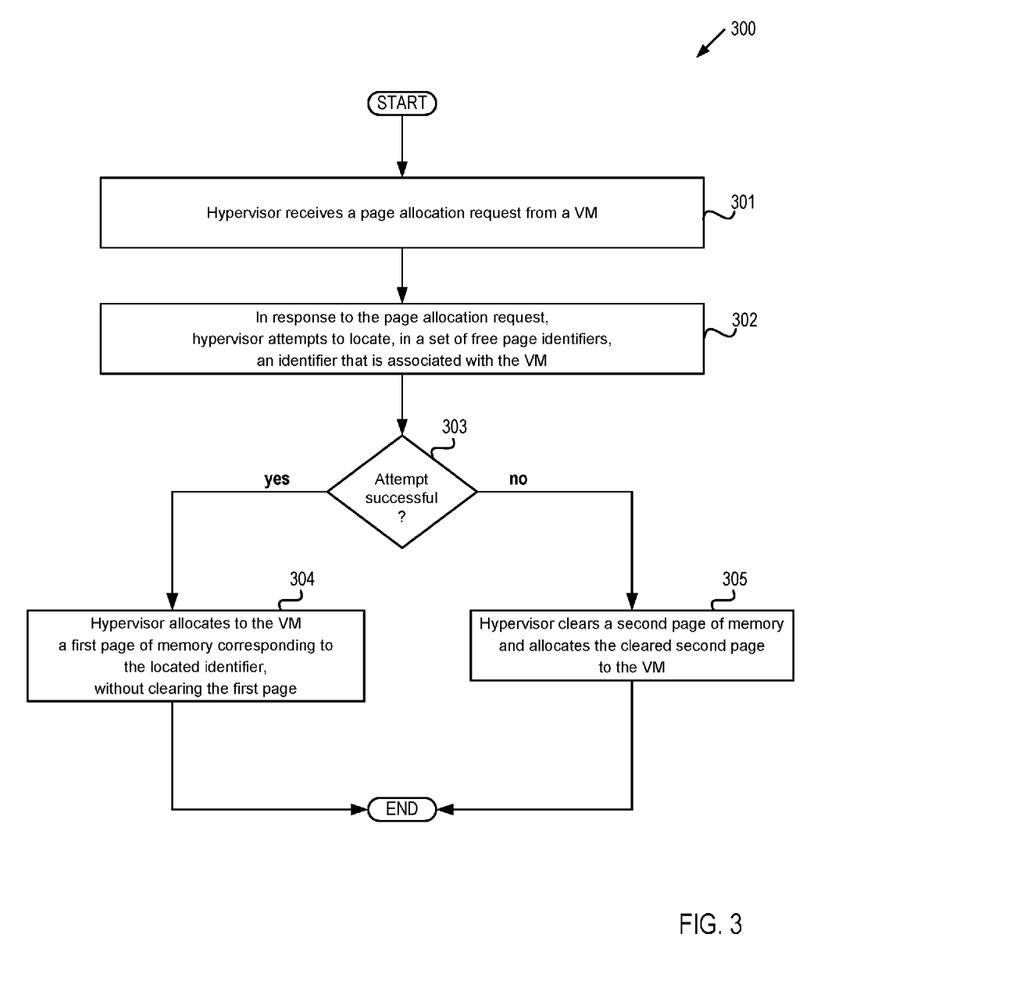
FIG. 3 depicts a flow diagram of one example of a second method for safely and efficiently allocating memory in virtualized systems, in accordance with one or more aspects of the present disclosure.

FIG. 3 depicts a flow diagram of one example of a second method 300 for safely and efficiently allocating memory in virtualized systems, in accordance with one or more aspects of the present disclosure. The method is performed by processing logic that comprises hardware (circuitry, dedicated logic, etc.), and that may also comprise computer programs (such as is run on a general purpose computer system or a dedicated machine). In one implementation, method 300 is performed by hypervisor 125 of computer system 100 of FIG. 1, and one or more blocks of the method may be performed by page allocator 128 of hypervisor 125. It should be noted that in some implementations blocks depicted in FIG. 3 may be performed simultaneously or in a different order than that depicted.

At block 301, hypervisor 125 receives a page allocation request from a VM. In response to the page allocation request, hypervisor 125 attempts at block 302 to locate, in the set of free page identifiers, an identifier of a page that is associated with the VM. If such an identifier is found, then that means that the VM previously returned that page to the hypervisor.

Block 303 branches based on whether the attempt at block 302 was successful. If the attempt was successful, execution proceeds to block 304; otherwise execution continues at block 305.

At block 304, hypervisor 125 allocates to the VM a first page of memory corresponding to the located identifier, without clearing the first page. As explained above, clearing is not necessary in this case because the page previously belonged to the VM, and was returned to the hypervisor; therefore, any data in this page was written by the VM, and not by any other VM.

At block 305, hypervisor 125 clears a second page of memory and allocates the cleared second page to the second VM. As explained above, in this case clearing is necessary to ensure data security, because the page may have previously been written to by another VM, or by some other entity (e.g., a non-virtualized application, host OS 120, a physical device, etc.).

As in method 200 of FIG. 2, in some examples the second page of memory might be in the set of free page identifiers, in which case the second page might be associated with a third VM (not depicted in FIG. 1), or might not be associated with any VM. In the case that the second page is associated with a third VM, the allocating of the second page might be in response to failing to locate, in the set of free page identifiers, an identifier that is not associated with any VM. In other words, some implementations might favor allocating a page that is not associated with any VM, over a page that is associated with another VM—the rationale being that this other VM might submit a page allocation request in the future, in which case a page already returned by this other VM can be allocated back to the VM without clearing.

In some other examples, the second page of memory might not be in the set of free page identifiers (for example, in a second set of free page identifiers that can be allocated to either VMs or non-virtualized entities, as is described above). In such cases, allocating a page that is not in the free set of identifiers might be done when the set of free page identifiers is empty.

Figure 4:
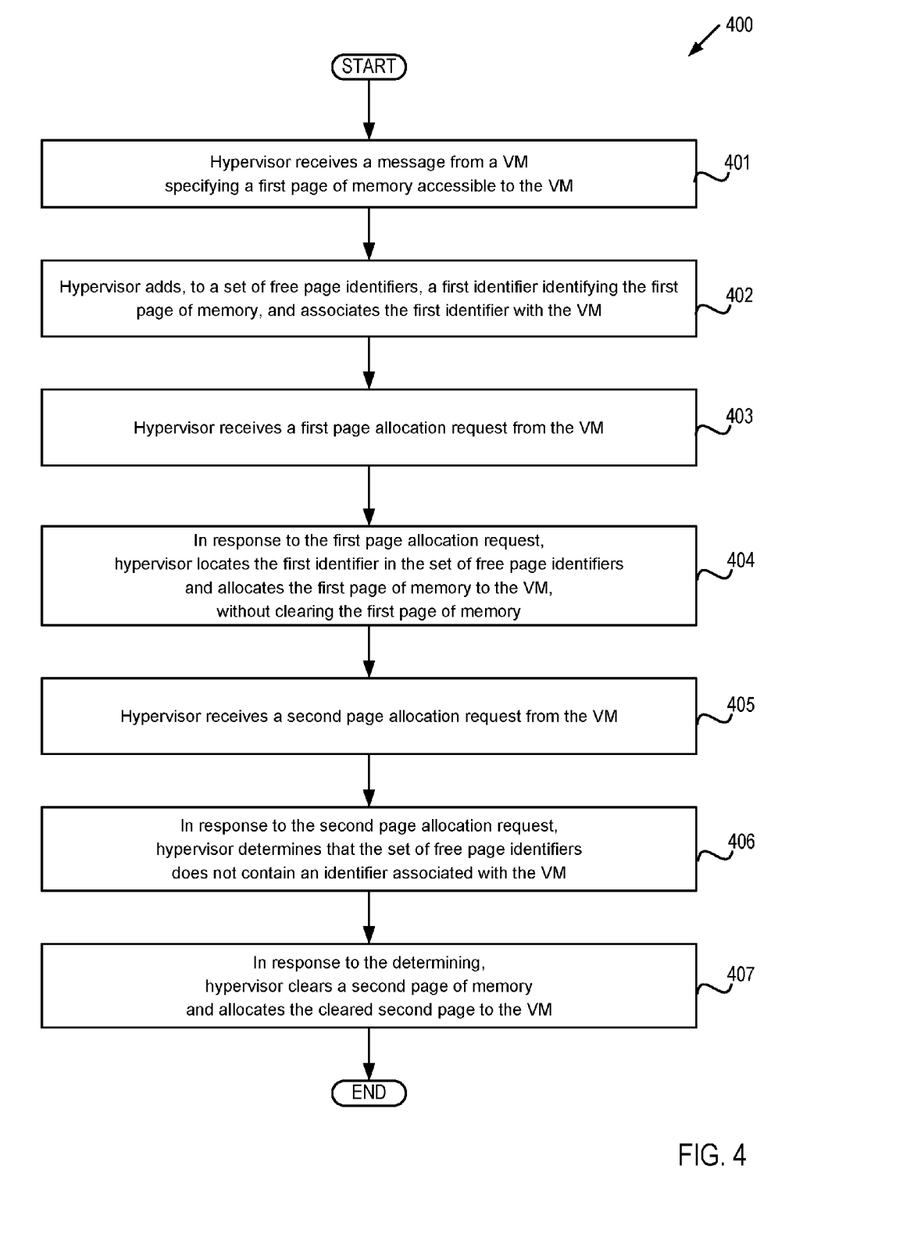
FIG. 4 depicts a flow diagram of one example of a third method for safely and efficiently allocating memory in virtualized systems, in accordance with one or more aspects of the present disclosure.

FIG. 4 depicts a flow diagram of one example of a third method 400 for safely and efficiently allocating memory in virtualized systems, in accordance with one or more aspects of the present disclosure. The method is performed by processing logic that comprises hardware (circuitry, dedicated logic, etc.), and that may also comprise computer programs (such as is run on a general purpose computer system or a dedicated machine). In one implementation, method 400 is performed by hypervisor 125 of computer system 100 of FIG. 1, and one or more blocks of the method may be performed by page allocator 128 of hypervisor 125. It should be noted that in some implementations blocks depicted in FIG. 4 may be performed simultaneously or in a different order than that depicted.

At block 401, hypervisor 125 receives from a VM (e.g., VM 130-1 of FIG. 1, VM 130-2 of FIG. 1, etc.) a message specifying a first page of memory accessible to the VM. In some implementations, the message might be sent via a hypercall, while in some other implementations the message might be sent via shared memory, while in yet other implementations the message might be sent in some other manner.

At block 402, hypervisor 125 adds, to a set of free page identifiers, a first identifier identifying the first page of memory, and associates the first identifier with the VM. As explained above, the association enables hypervisor 125 to determine, when a page allocation request is made in the future, that the page was returned to the hypervisor by the VM—which in turn indicates to hypervisor 125 whether or not to clear the page before allocating it to the requesting VM.

At block 403, hypervisor 125 receives a first page allocation request from the VM. In response to the first page allocation request, hypervisor 125 locates, at block 404, the first identifier in the set of free page identifiers and allocates the first page of memory to the VM, without clearing the first page of memory.

At block 405, hypervisor 125 receives a second page allocation request from the VM. In response to the second page allocation request, hypervisor 125 determines, at block 406, that the set of free page identifiers does not contain an identifier associated with the VM. In response to the determination at block 406, hypervisor 125 clears, at block 407, a second page of memory and allocates the cleared second page to the VM.

Figure 5:
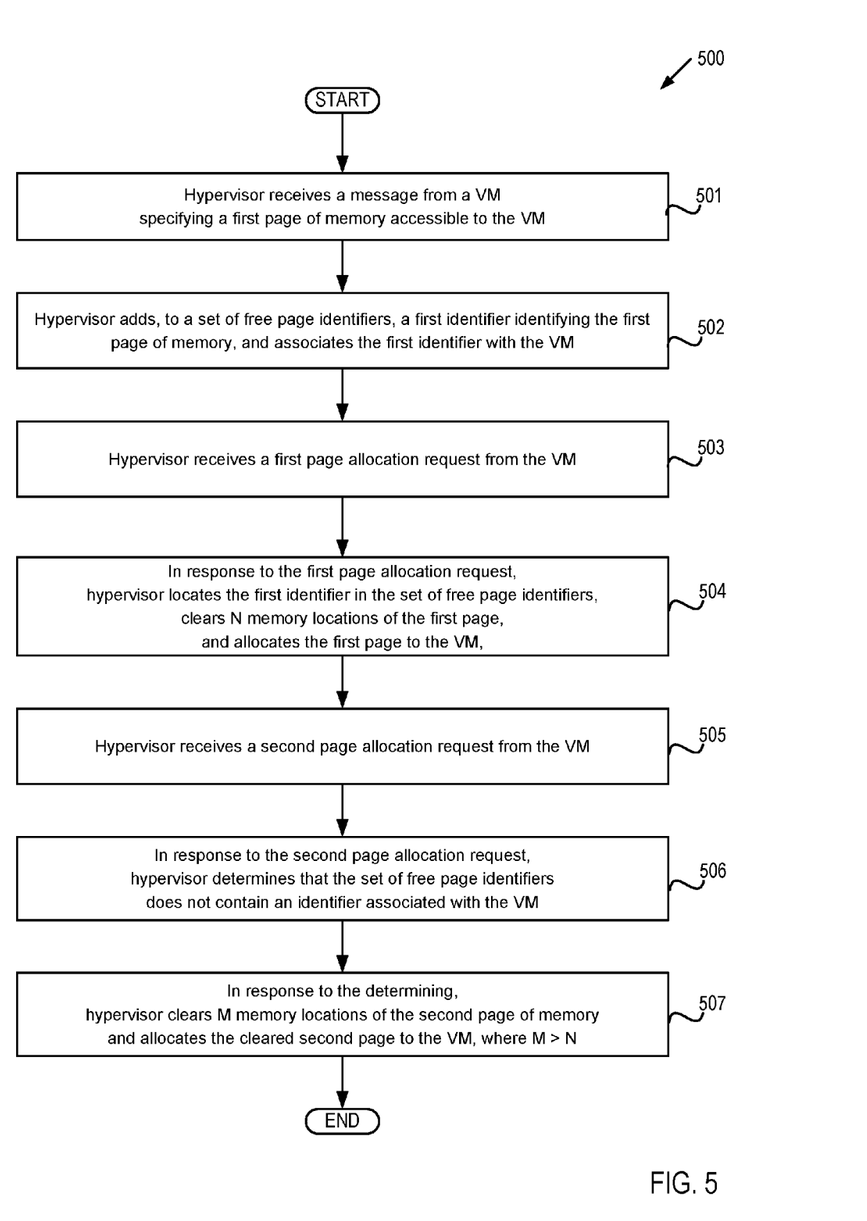
FIG. 5 depicts a flow diagram of one example of a fourth method for allocating memory in virtualized systems, in accordance with one or more aspects of the present disclosure

FIG. 5 depicts a flow diagram of one example of a fourth method 500 for allocating memory in virtualized systems, in accordance with one or more aspects of the present disclosure. The method is similar to the method of FIG. 4; however, instead of an "all-or-nothing" clearing, clearing is performed for both successful and unsuccessful location attempts, with fewer memory locations of the page being cleared for the successful case than for the unsuccessful case. It should be noted that this alternative implementation with respect to FIG. 4 may also be employed in alternative implementations of the methods of FIGS. 2 and 3.

The method 500 is performed by processing logic that comprises hardware (circuitry, dedicated logic, etc.), and that may also comprise computer programs (such as is run on a general purpose computer system or a dedicated machine). In one implementation, method 500 is performed by hypervisor 125 of computer system 100 of FIG. 1, and one or more blocks of the method may be performed by page allocator 128 of hypervisor 125. It should be noted that in some implementations blocks depicted in FIG. 5 may be performed simultaneously or in a different order than that depicted.

At block 501, hypervisor 125 receives from a VM (e.g., VM 130-1 of FIG. 1, VM 130-2 of FIG. 1, etc.) a message specifying a first page of memory accessible to the VM. In some implementations, the message might be sent via a hypercall, while in some other implementations the message might be sent via shared memory, while in yet other implementations the message might be sent in some other manner.

At block 502, hypervisor 125 adds, to a set of free page identifiers, a first identifier identifying the first page of memory, and associates the first identifier with the VM. As explained above, the association enables hypervisor 125 to determine, when a page allocation request is made in the future, that the page was returned to the hypervisor by the VM—which in turn indicates to hypervisor 125 whether or not to clear the page before allocating it to the requesting VM.

At block 503, hypervisor 125 receives a first page allocation request from the VM. In response to the first page allocation request, hypervisor 125 locates, at block 504, the first identifier in the set of free page identifiers, clears N memory locations of the first page, where N is a non-negative integer that is less than the page size, and allocates the first page of memory to the VM.

At block 505, hypervisor 125 receives a second page allocation request from the VM. In response to the second page allocation request, hypervisor 125 determines, at block 506, that the set of free page identifiers does not contain an identifier associated with the VM. At block 507, in response to the determination at block 506, hypervisor 125 clears M memory locations of the second page, where M is a positive integer that is greater than N and less than or equal to the page size, and allocates the second page of memory to the VM.

Figure 6:
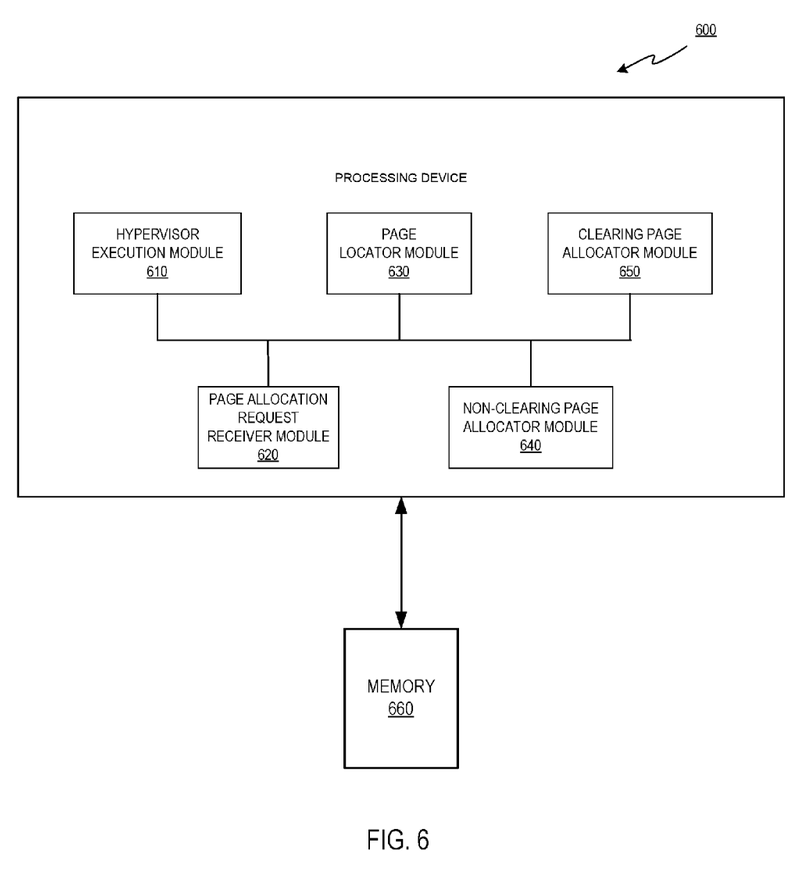
FIG. 6 depicts a block diagram of an illustrative computer system operating in accordance with one or more aspects of the disclosure.

FIG. 6 depicts a block diagram of an illustrative computer system 600 operating in accordance with one or more aspects of the disclosure. In various illustrative examples, computer system 600 may correspond to a computing device within system architecture 100 of FIG. 1. Computer system 600 comprises a memory and a processing device that may include components to enable efficient and secure allocation of memory to virtual machines. In one example, the processing device may include a hypervisor execution module 610, a page allocation request receiver module 620, a page locator module 630, a non-clearing page allocator module 640, and a clearing page allocator module 650.

In one implementation, hypervisor execution module 610 executes a hypervisor that performs one or more blocks of one or more of the flowcharts of FIGS. 2 through 6. Page allocation request receiver module 620 receives a page allocation request from a VM. In response to the request, page locator module 630 attempts to locate, in a set of free page identifiers, an identifier that is associated with the VM.

In response to a successful attempt, non-clearing page allocator module 640 allocates to the VM a first page of memory corresponding to the located identifier, without clearing the first page. In response to an unsuccessful attempt, clearing page allocator module 650 clears a second page of memory and allocates the cleared second page to the VM.

Figure 7:
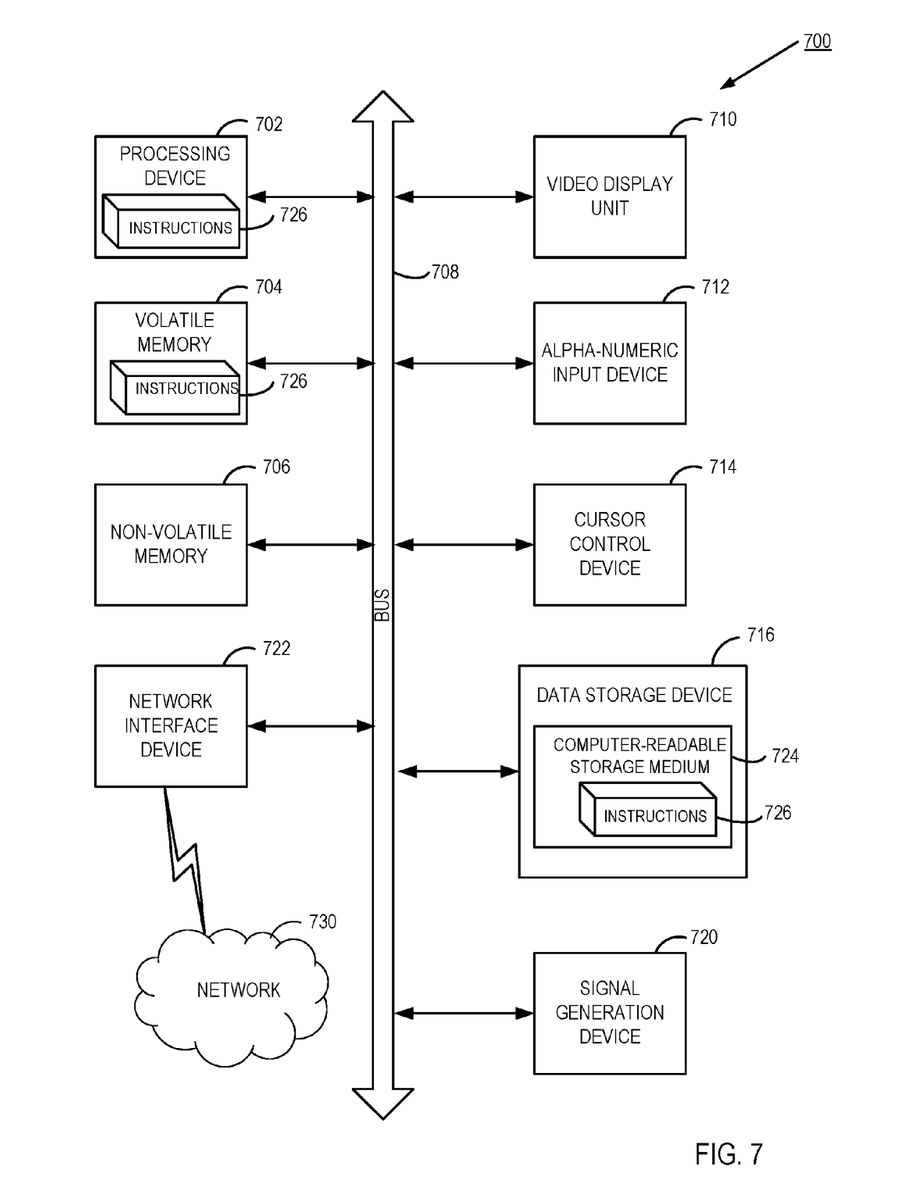
FIG. 7 depicts a block diagram of another illustrative computer system operating in accordance with one or more aspects of the disclosure.

FIG. 7 depicts a block diagram of another illustrative computer system 700 operating in accordance with one or more aspects of the disclosure. In various illustrative examples, computer system 700 may correspond to a computing device within system architecture 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 700 may be connected (e.g., via a network 630, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 200, 300, 400, and 500 of FIGS. 2 through 5.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "executing," "receiving," "determining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 300, and 400 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processing device executing a hypervisor, from a first virtual machine (VM), a message specifying a page of memory being relinquished by the first VM;
   determining, by the hypervisor, that the page is not accessible to other virtual machines;
   adding, by the hypervisor, to a set of free page identifiers, a page identifier identifying the specified page of memory, and associating the page identifier with the first VM;
   receiving, by the hypervisor, a page allocation request from a second VM;
   in response to the page allocation request, searching, by the hypervisor, the set of free page identifiers for a page identifier that is associated with the second VM that sent the page allocation request;
   in response to determining that the set of free page identifiers includes the page identifier associated with the second VM, determining that data in a first page corresponding to the page identifier associated with the second VM was written by the second VM and not any other VM, and allocating to the second VM, by the hypervisor, the first page, without clearing the first page; and
   in response to determining that the set of free page identifiers does not include the page identifier associated with the second VM, clearing, by the hypervisor, a second page of memory and allocating the cleared second page to the second VM.

2. The method of claim 1 wherein the second page of memory is in the set of free page identifiers.

3. The method of claim 2 wherein the second page of memory is associated with a third VM.

4. The method of claim 3, wherein the allocating of the second page of memory is in response to failing to locate, in the set of free page identifiers, an identifier that is not associated with any VM.

5. The method of claim 1 wherein the second page of memory is not in the set of free page identifiers.

6. The method of claim 5, wherein the allocating of the second page of memory is in response to the set of free page identifiers being empty.

7. The method of claim 1 further comprising:
   in response to determining that the set of free page identifiers does not include the page identifier associated with the second VM, finding a page identifier that is not associated with any VM, clearing a third page corresponding to the page identifier that is not associated with any VM, and allocating the cleared third page to the second VM.

8. An apparatus comprising:
   a memory to store a set of free page identifiers; and
   a processing device, operatively coupled to the memory, to:

execute a hypervisor;

receive, via the hypervisor, a page allocation request from a virtual machine (VM);

in response to the page allocation request, search, the set of free page identifiers, for a page identifier that is associated with the VM;

in response to determining that the set of free page identifiers includes the page identifier associated with the VM, determine that data in a first page corresponding to the page identifier associated with the VM was written by the VM and not any other VM, and allocate to the VM, via the hypervisor, the first page, without clearing the first page; and in response to determining that the set of free page identifiers does not include the page identifier associated with the VM, clear, by the hypervisor, a second page and allocate the cleared second page to the VM.

9. The apparatus of claim 8 wherein the second page of memory is in the set of free page identifiers.

10. The apparatus of claim 9 wherein the second page of memory is associated with another VM.

11. The apparatus of claim 10, wherein the allocating of the second page of memory is in response to failing to locate, in the set of free page identifiers, an identifier that is not associated with any VM.

12. The apparatus of claim 9 wherein the second page of memory is not in the set of free page identifiers.

13. The method of claim 12, wherein the allocating of the second page of memory is in response to the set of free page identifiers being empty.

14. The apparatus of claim 8 wherein:

in response to determining that the set of free page identifiers does not include the page identifier associated with the VM, the processing device is to find a page identifier that is not associated with any VM, clear a third page corresponding to the page identifier that is not associated with any VM, and allocate the cleared third page to the VM.

15. A non-transitory computer-readable storage medium comprising instructions that when executed by a processing device, cause the processing device to execute a hypervisor to:

receive, from a first virtual machine (VM), a message specifying a page of memory being relinquished by the first VM;

add, to a set of free page identifiers, a page identifier identifying the specified page of memory, and associate the page identifier with the first VM;

receive a page allocation request from a second VM;

in response to the page allocation request, search, by the hypervisor, the set of free page identifiers for a page identifier that is associated with the second VM that sent the page allocation request;

in response to determining that the set of free page identifiers includes the page identifier associated with the second VM, determine that data in a first page corresponding to the page identifier associated with the second VM was written by the second VM and not any other VM, and allocate to the second VM the first page, without clearing the first page; and in response to determining that the set of free page identifiers does not include the page identifier associated with the second VM, clear a second page and allocate the cleared second page to the second VM.

16. The non-transitory computer-readable storage medium of claim 15, wherein the second page of memory is in the set of free page identifiers.

17. The non-transitory computer-readable storage medium of claim 16, wherein the second page of memory is associated with another VM.

18. The non-transitory computer-readable storage medium of claim 17, wherein the first VM sends the message to the hypervisor via a hypercall.

19. The non-transitory computer-readable storage medium of claim 16, wherein the first VM sends the message to the hypervisor via shared memory.

20. The non-transitory computer-readable storage medium of claim 15 wherein:

in response to determining that the set of free page identifiers does not include the page identifier associated with the second VM, the processing device is to find a page identifier that is not associated with any VM, clear a third page corresponding to the page identifier that is not associated with any VM, and allocate the cleared third page to the second VM.

* * * * *